United States Patent [19]

Wijkström

[11] Patent Number: 5,022,065
[45] Date of Patent: Jun. 4, 1991

[54] X-RAY FILM HOLDER

[76] Inventor: Karin Wijkström, Trastvägen 12, S-230 10, Skanör, Sweden

[21] Appl. No.: 437,391

[22] Filed: Nov. 16, 1989

[30] Foreign Application Priority Data

Nov. 24, 1988 [SE] Sweden .............................. 8804242

[51] Int. Cl.⁵ .................... A61B 6/14; G03B 42/02; G03B 42/04
[52] U.S. Cl. .................................. 378/168; 378/169; 378/173; 378/187
[58] Field of Search ............... 378/168, 173, 169, 187, 378/170

[56] References Cited

U.S. PATENT DOCUMENTS

| | | | |
|---|---|---|---|
| 2,786,947 | 3/1957 | Lieberman | 378/168 |
| 3,356,845 | 12/1967 | Bergendal | 378/168 |
| 3,777,141 | 12/1973 | Eggen | 378/168 |
| 4,251,732 | 2/1981 | Fried | 378/170 |
| 4,295,050 | 10/1981 | Linden | 378/120 |

Primary Examiner—Edward P. Westin
Assistant Examiner—Don Wong
Attorney, Agent, or Firm—Griffin, Branigan & Butler

[57] ABSTRACT

This invention relates to an x-ray film holder for intra-oral photographing, comprising a holder head (2) with three slots (10, 11, 12) intended to hold films in different positions and to be inserted in the mouth-cavity of the patient with a film in any of the said slots, and a handle (1) comprising at least a substantially flat bite portion, so that the occlusion plane will be lying on each side of said flat portion. The three slots in the holder head consist of a first slot (10) for a lying film (FIG. 2A) for so called bite-wing exposure, where crowns as well as the border portion of the bone in one of both the jaws are visible on the developed picture, a second slot (11) for an upraised film (FIG. 2B) for so called upraised bite-wing exposure, where crowns as well as the border portion of the bone in both the jaws are visible on the developed picture, and a third slot (12) for so called apical pictures (FIG. 2C) where crown as well as root- and jaw-bone is visible on the developed picture but nothing of the other jaw.

7 Claims, 2 Drawing Sheets

X-RAY FILM HOLDER

TECHNICAL FIELD

This invention relates to an x-ray film holder for intra-oral photographing, comprising a holder head with three slots intended to hold films in different positions and to be inserted in the mouth-cavity of the patient with a film in any of the said slots, and a handle comprising at least a substantially flat bite portion.

BACKGROUND OF THE INVENTION

There are available many strong and good holders for so called bitewing pictures, i.e. pictures of the type where crowns as well as the border portion of the bone in both the upper jaw and the lower jaw are visible at the same time on the developed picture, and also for so called apical pictures, i.e. pictures of the type where crowns as well as the border portion and that the jaw-bone in one jaw are visible on the developed picture. However, there are no quite good holders available for so called upright bite-wing pictures, and above all there does not exist any holders which can firmly hold films for all the three conventional types of intra-oral x-ray pictures. It is particularly a drawback that it does not exist any very good holders for so called upright bite-wing pictures, since such pictures often are required in order to make correct diagnosis of the degree of parodontose or parodontite which a patient possibly may suffer from, and it is for this purpose necessary to be able to see the position of the border of the bone in relation to the length of the tooth. As far as the expression "bite-wing" is concerned, the expression possibly emanates from the fact that in the past there were used films which were mounted on a folded strip of paper, wherein the patient bit about a paper wing, while today the expression "bite-wing" relates to the final picture, i.e. a film on which the crowns of the teeth and the border of the bone are visible at the same time in both the jaws. It is the latter meaning that shall be interpreted in the expression "bite-wing" in this text.

BRIEF DISCLOSURE OF THE INVENTION

The purpose of the invention is to solve the above mentioned problems by offering a new, improved x-ray film holder. The holder shall in the first place be able to be used for the type of film that is normally used for intra-oral x-ray photographing, i.e. a film which for time being normally has a breadth of 41 mm and a height of 31 mm, but the holder shall advantageously also be applicable for so called children's film which has smaller dimensions; for the time being the size 35×22 mm. These and other objects can be achieved therein that the invention is characterized of what is stated in the appending patent claims. Further characteristic features and aspects of the invention will be apparent from the following description of a preferred embodiment.

BRIEF DESCRIPTION OF DRAWINGS

In the following description of a preferred embodiment, reference will be made to the accompanying drawings, in which.

DESCRIPTION OF PREFERRED EMBODIMENT

Figure 1:
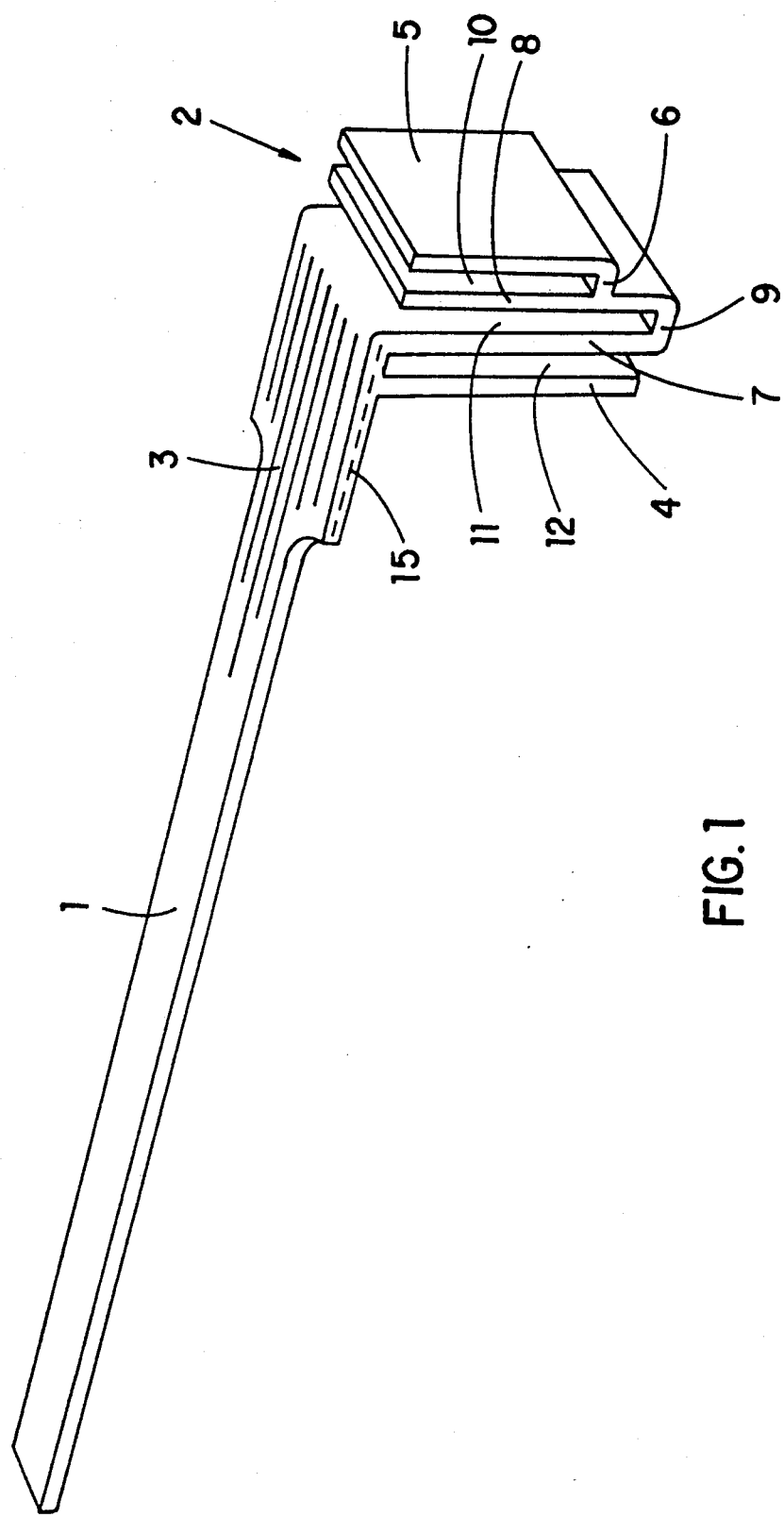
FIG. 1 is a perspective view of a holder according to the preferred embodiment.

The holder shown in FIG. 1 consists of a handle 1 and a holder head 2. At least the portion 3 of the handle which is adjacent to the head 2 is flat. The holder 2 exhibits an inner end wall 4 which extends at right angle downwards (or upwards, depending on how the holder is held) from the flat portion 3, and an outer end wall 5, which is parallel with the inner end wall 4 and extends from a bottom 6 up to a level coinciding with the longitudinal center line 15 of the handle 1. The line 15 has been shown by dashed lines in FIG. 1. Further there is an inner partition wall 7 and an outer partition wall 8. The inner partition wall 7 extends from the plane of the handle down to a bottom 9, and the outer partition wall 8 extends from said bottom 9 up to at level with the center line 15 of handle 1.

Figure 2A:
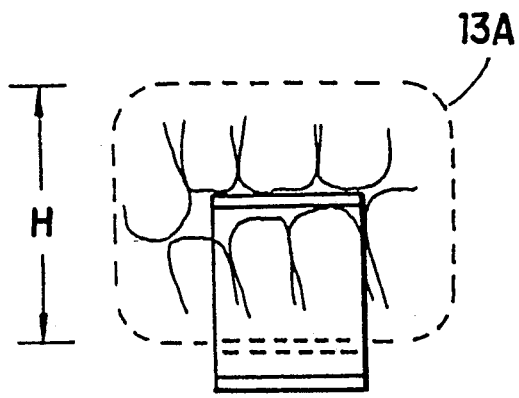
FIG. 2A is an end-view of the holder with an x-ray film mounted for so called bite-wing exposure.

Between the outer wall 5 and the outer partition wall 8 there is a first slot 10 for so called bite-wing pictures 13A. This slot 10 has a depth which corresponds exactly with half the height H, FIG. 2A, of a normal sized x-ray film, see above, provided in slot 10 for bite-wing exposure.

Figure 2B:
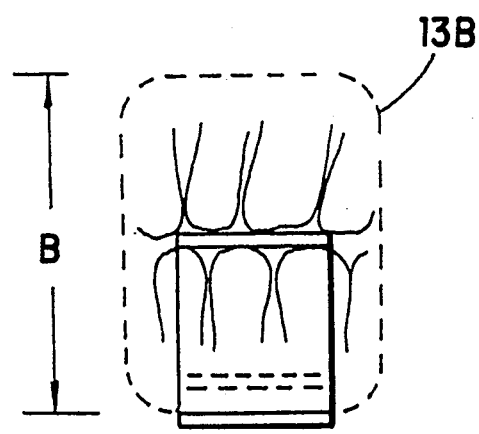
FIG. 2B shows the same end-view with an x-ray film mounted for so called upright bite-wing exposure and FIG. 2C shows the same end-view with an x-ray film mounted for apical exposure.

Between the two partition walls 7 and 8 there is a second slot 11 for so called upright bite-wing pictures 13B, the depth of this second slot 11 being exactly half the breadth B, FIG. 2B, of a normal sized x-ray film, see above, for bite-wing exposure.

Figure 2C:
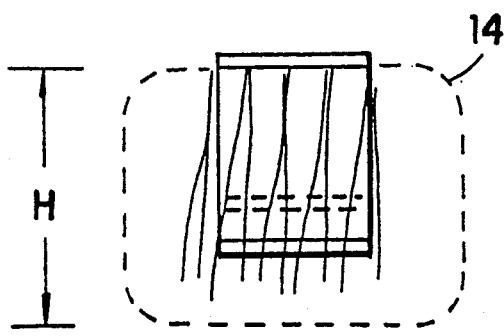

Finally, between the inner wall 4 and the inner partition wall 7 there is a third slot 12 for apical pictures 14. The depth/height of this third slot 12 is ⅔ of the height H, FIG. 2C, of a normal sized x-ray film, see above, in order to support the film and prevent that it will be bent when the patient bites about the handle 1. This slot also can be used for children's film, which has somewhat smaller dimensions than normal film (usually 35×22 mm), see above.

When the device is to be used, a bite-wing film 13A, 13B is mounted in one of the two outer slots 10 and 11, or an apical picture film 14 is placed in the inner slot 12. The holder is held either as is shown in FIG. 1 for exposure of in the first place teeth in the lower jaw, or up and down for the exposure of substantially teeth in the upper jaw. In both cases the films 13A, 13B, and 14 and will be held firmly in all the slots and in a correct manner when the patient bites about the flat portion 3 of the handle 1.

The embodiment of the holder according to the invention may modified within the spirit and scope of the invention, as defined by the appending claims. For example the walls 4, 5 and 6 need not necessarily be "unbroken" but may advantageously also be provided with a number of minor holes or with a single large opening, which may facilitate the manufacturing through moulding. The walls thus may more or less be shaped as loops or frames.

I claim:

1. An x-ray film holder for disposition of inter-oral dental X-ray film in the oral cavity of a patient, comprising:
    (1) a substantially flat bite portion for securing a portion of the holder in the oral cavity by the bite thereon of a patient so that an occlusion plane of the bite will lie on each side of the flat bite portion;

(2) a handle for manipulating the holder into and in the oral cavity, said handling being connected to said flat bite portion and configured so as to extend outside of the oral cavity when the holder is in place in the oral cavity;

(3) a holder head for holding and positioning the X-ray film in the oral cavity, said holder head being connected to said flat bite portion and being configured so as to be disposable in the oral cavity and said holder head having three separate slots therein, wherein:

(a) a first slot is configured for holding the X-ray film in the bite-wing position where the crowns of teeth and border portions of the bone in both jaws next to the so-positioned film are X-ray imagable by said film;

(b) a second slot is configured for holding X-ray film in the upraised bite-wing position where the crowns of teeth and border portions of the bone in both of the jaws next to the so-called positioned film are X-ray imagable by said film; and (c) a third slot is configured for holding X-ray film in the apical position where the crowns of teeth, roots of teeth and the associated bone in one jaw only next to the so-positioned film are X-ray imagable by said film.

2. Holder according to claim 1, characterized in that the depth of the first slot from a longitudinal center line of said flat bite portion corresponds to about half the height of said X-ray film.

3. Holder according to claim 1, characterized in that the depth of the second slot from a longitudinal center line of said flat bite portion corresponds to about half the breadth of said X-ray film.

4. Holder according to claim 1, characterized in that a third slot extends from a level substantially coincident with a longitidinal plane of said flat bite portion to a depth of about two-thirds of the height of said X-ray film.

5. Holder according to claim 1, characterized in that the first and the second slots define two outer slots of the holder head and the third slot defines the slot most adjacent to the handle.

6. Holder according to claim 5, characterized in that the first slot defines the outermost slot and the second slot lies between said first slot and said third slot.

7. Holder according to claim 1, characterized in that it consists of a plastic body formed in one piece.

* * * * *